United States Patent
Isidro et al.

(10) Patent No.: US 12,228,652 B2
(45) Date of Patent: Feb. 18, 2025

(54) APPARATUS FOR ESTIMATING VEHICLE POSE USING LIDAR SENSOR AND METHOD THEREOF

(71) Applicant: HYUNDAI MOBIS Co., Ltd., Seoul (KR)

(72) Inventors: Pedro Isidro, Düsseldorf (DE); Oleg Chernikov, Eschborn (DE); Doychin Tsanev, Haar (DE); Luka Lukic, Hofheim (DE)

(73) Assignee: HYUNDAI MOBIS CO., LTD., Seoul (KR)

( * ) Notice: Subject to any disclaimer, the term of this patent is extended or adjusted under 35 U.S.C. 154(b) by 250 days.

(21) Appl. No.: 17/897,586

(22) Filed: Aug. 29, 2022

(65) Prior Publication Data

US 2024/0069206 A1    Feb. 29, 2024

(51) Int. Cl.
*G01S 17/931*    (2020.01)
*B60W 40/10*    (2012.01)
(Continued)

(52) U.S. Cl.
CPC ........... *G01S 17/931* (2020.01); *B60W 40/10* (2013.01); *B60W 50/00* (2013.01); *G01S 7/497* (2013.01); *G01S 17/89* (2013.01); *B60W 2050/0088* (2013.01); *B60W 2420/408* (2024.01); *B60W 2520/10* (2013.01); *B60W 2520/14* (2013.01);
(Continued)

(58) Field of Classification Search
None
See application file for complete search history.

(56) References Cited

U.S. PATENT DOCUMENTS

| 8,798,925 B2 * | 8/2014 | Kellar | G01S 19/47 701/472 |
| 9,689,684 B2 * | 6/2017 | Sheard | G05D 1/10 |

(Continued)

FOREIGN PATENT DOCUMENTS

| CA | 3076834 C * | 9/2023 | ............ B60W 10/04 |
| CN | 110906950 A | 3/2020 | |

(Continued)

OTHER PUBLICATIONS

European Search Report issued in corresponding European Application No. 22192334.5 dated Mar. 13, 2023.

*Primary Examiner* — Kevin R Steckbauer
(74) *Attorney, Agent, or Firm* — Morgan, Lewis & Bockius LLP

(57) ABSTRACT

Disclosed herein is a vehicle including a light detection and ranging (LiDAR) sensor configured to acquire a point cloud for the vehicle, a vehicle control network unit configured to control the vehicle, a motion unit configured to estimate a motion of the vehicle, a controller configured to estimate a ground plane of the LiDAR, and an automatic calibrator configured to calibrate a pose of the vehicle. The LiDAR sensor acquires time information; the vehicle control network unit processes a speed and a yaw rate of the vehicle; the motion unit calculates motion information and estimated information about the vehicle; the controller calculates ground plane information and estimated information about the vehicle; and the automatic calibrator calculates pose information and estimated information about the vehicle.

20 Claims, 6 Drawing Sheets

```
Algorithm 1 LiDAR online AC step
1: if travelling AND not turning too fast then
2:      compute (1) road calibration {z, Roll, Pitch}
3:      Update {z, Roll, Pitch} filters
4: end if
5: if travelling AND not turning AND {Roll, Pitch} available then
6:      Compute (2) yaw calibration {Yaw}
7:      Update {Yaw} filter
8: end if
9: if travelling AND turning fast AND {Roll, Pitch, Yaw} available then
10:     Compute (3) horizontal position calibration {x,y}
11:     Update {x,y} filters
12: end if
```

(51) Int. Cl.
  *B60W 50/00*  (2006.01)
  *G01S 7/497*  (2006.01)
  *G01S 17/89*  (2020.01)

(52) U.S. Cl.
  CPC ..... *B60W 2520/16* (2013.01); *B60W 2520/18* (2013.01); *B60W 2556/45* (2020.02)

(56) References Cited

U.S. PATENT DOCUMENTS

| | | | | |
|---|---|---|---|---|
| 10,260,862 B2* | 4/2019 | Ramalingam | .......... | G01B 21/24 |
| 10,479,373 B2* | 11/2019 | Mudalige | .............. | B60W 30/08 |
| 10,502,819 B2* | 12/2019 | Chon | ..................... | G05D 1/027 |
| 10,860,871 B2* | 12/2020 | Zhu | ....................... | G01S 7/4972 |
| 10,906,536 B2* | 2/2021 | Smith | .................... | G06N 20/00 |
| 11,525,688 B2* | 12/2022 | Lee | ......................... | G01S 19/49 |
| 11,615,706 B2* | 3/2023 | Gupta | ..................... | B60Q 9/00 |
| | | | | 340/905 |
| 11,654,917 B2* | 5/2023 | Smith | .................... | G06N 20/00 |
| | | | | 701/23 |
| 11,835,342 B2* | 12/2023 | Zeng | .................... | G01C 25/005 |
| 11,835,629 B2* | 12/2023 | Liu | ....................... | G01S 17/931 |
| 11,841,437 B2* | 12/2023 | Zhu | ....................... | G05D 1/0278 |
| 12,055,406 B2* | 8/2024 | Jeon | .................... | G01C 21/3658 |
| 2005/0060093 A1* | 3/2005 | Ford | ....................... | G01S 19/49 |
| | | | | 701/472 |
| 2017/0124693 A1* | 5/2017 | Ramalingam | ............. | G06T 7/70 |
| 2017/0193384 A1* | 7/2017 | Mudalige | ............... | G08G 1/161 |
| 2018/0113204 A1* | 4/2018 | Chon | ...................... | G01P 15/18 |
| 2019/0315351 A1* | 10/2019 | Smith | .................... | G01S 17/86 |
| 2019/0383627 A1* | 12/2019 | Nangeroni | ........ | B60W 50/0098 |
| 2020/0318971 A1* | 10/2020 | Mori | .................... | B60W 30/04 |
| 2021/0146932 A1* | 5/2021 | Smith | ..................... | G05D 1/81 |
| 2024/0069206 A1* | 2/2024 | Isidro | .................... | G01S 7/4972 |

FOREIGN PATENT DOCUMENTS

| | | | | |
|---|---|---|---|---|
| CN | 114219852 A | | 3/2022 | |
| CN | 115265581 A | * | 11/2022 | ........... G01C 25/005 |

\* cited by examiner

FIG. 5

| Algorithm 1 LiDAR online AC step |
|---|
| 1: if travelling AND not turning too fast then |
| 2:     compute (1) road calibration {z, Roll, Pitch} |
| 3:     Update {z, Roll, Pitch} filters |
| 4: end if |
| 5: if travelling AND not turning AND {Roll, Pitch} available then |
| 6:     Compute (2) yaw calibration {Yaw} |
| 7:     Update {Yaw} filter |
| 8: end if |
| 9: if travelling AND turning fast AND {Roll, Pitch, Yaw} available then |
| 10:     Compute (3) horizontal position calibration {x,y} |
| 11:     Update {x,y} filters |
| 12: end if |

APPARATUS FOR ESTIMATING VEHICLE POSE USING LIDAR SENSOR AND METHOD THEREOF

BACKGROUND OF THE DISCLOSURE

Field of the Disclosure

The present embodiments are applicable to vehicles in all fields, and more specifically, to, for example, a technology for estimating and compensating for a motion of a vehicle.

Discussion of the Related Art

Light detection and ranging (LiDAR) sensors are widely used together with cameras and radars in environment recognition required for advanced driver assistance systems (ADAS) and autonomous driving (AD) automotive applications. LiDAR provides an accurate range measurement of the environment, which is needed to estimate the exact distances to moving objects and stationary objects in the environment and detect obstacles on a driving path.

SUMMARY OF THE DISCLOSURE

An object of the present disclosure provided to substantially obviate the problems as described above is to automatically estimate a vehicle pose and calculate a compensation value through a network, a motion estimation technology, and a calibration technology. An object of the present disclosure is to increase the accuracy of the sensing technology for the vehicle. An Automated and online calibration procedure is required during vehicle operation. A calibration procedure is required for vehicles that incorporate LiDAR sensors. Therefore, an object of the present disclosure is to generate reliable vehicle information through LiDAR sensing information and location information about the vehicle.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a vehicle may include a light detection and ranging (LiDAR) sensor configured to acquire a point cloud for the vehicle, a vehicle control network unit configured to control the vehicle, a motion unit configured to estimate a motion of the vehicle, a controller configured to estimate a ground plane of the LiDAR sensor, and an automatic calibrator configured to calibrate a pose of the vehicle. The LiDAR sensor may acquire time information; the vehicle control network unit may process a speed and a yaw rate of the vehicle; the motion unit may calculate motion information and estimated information about the vehicle; the controller may calculate ground plane information and estimated information about the vehicle; and the automatic calibrator may calculate pose information and estimated information about the vehicle.

According to embodiments, a drift may be compensated for and change in sensor position relative to the drive may be sensed. Embodiments do not rely on calibration of other environmental sensors, and therefore sensor redundancy may be maintained even when other sensors are miscalibrated. Each uncertainty according to the 6-DoF pose may be estimated, and thus certainty may be established. As there is no dependence on previous offline calibration procedures, time and equipment may be significantly saved in terms of both the OEM assembly line and auto repair shop services.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 shows an AC method according to embodiments; and

DETAILED DESCRIPTION OF THE DISCLOSURE

Figure 1:
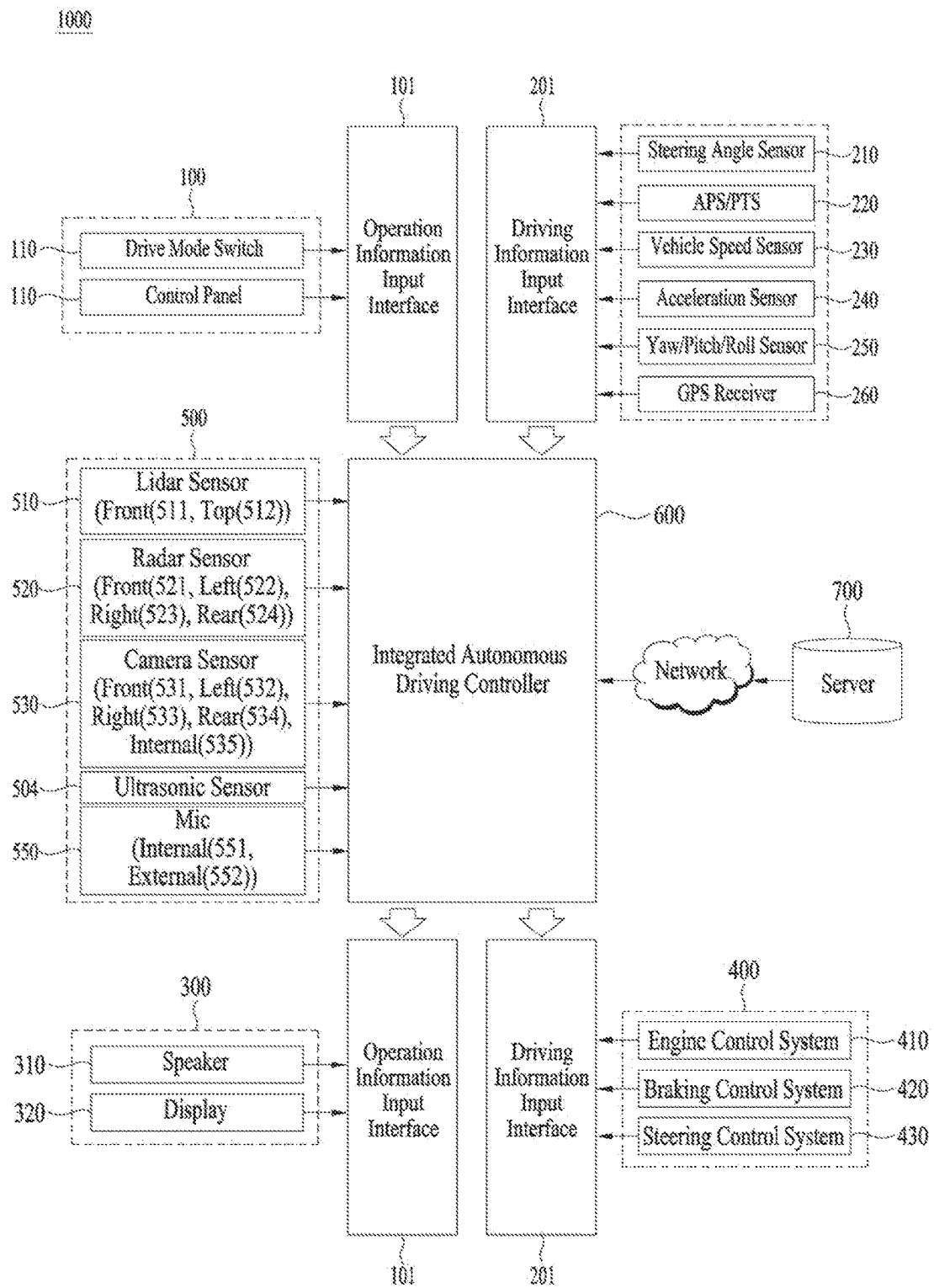
FIG. 1 is an overall block diagram of an autonomous driving control system to which an autonomous driving device according to any one of embodiments of the present disclosure may be applied.

Hereinafter, embodiments of the present disclosure will be described in detail with reference to the accompanying drawings to provide a further understanding of the present disclosure to those of ordinary skill in the art. It will be apparent to those skilled in the art that the present disclosure can be implemented in various different forms and is not limited to the embodiments described herein. In the drawings, parts irrelevant to the description are omitted in order to clearly describe the present disclosure. Wherever possible, the same reference numbers will be used throughout the specification to refer to the same or like parts.

In the specification, when a part "comprises" or "includes" an element, it means that the part may further comprise or include another element unless otherwise mentioned.

FIG. 1 is an overall block diagram of an autonomous driving control system to which an autonomous driving apparatus according to any one of embodiments of the present disclosure may be applied.

Figure 2:
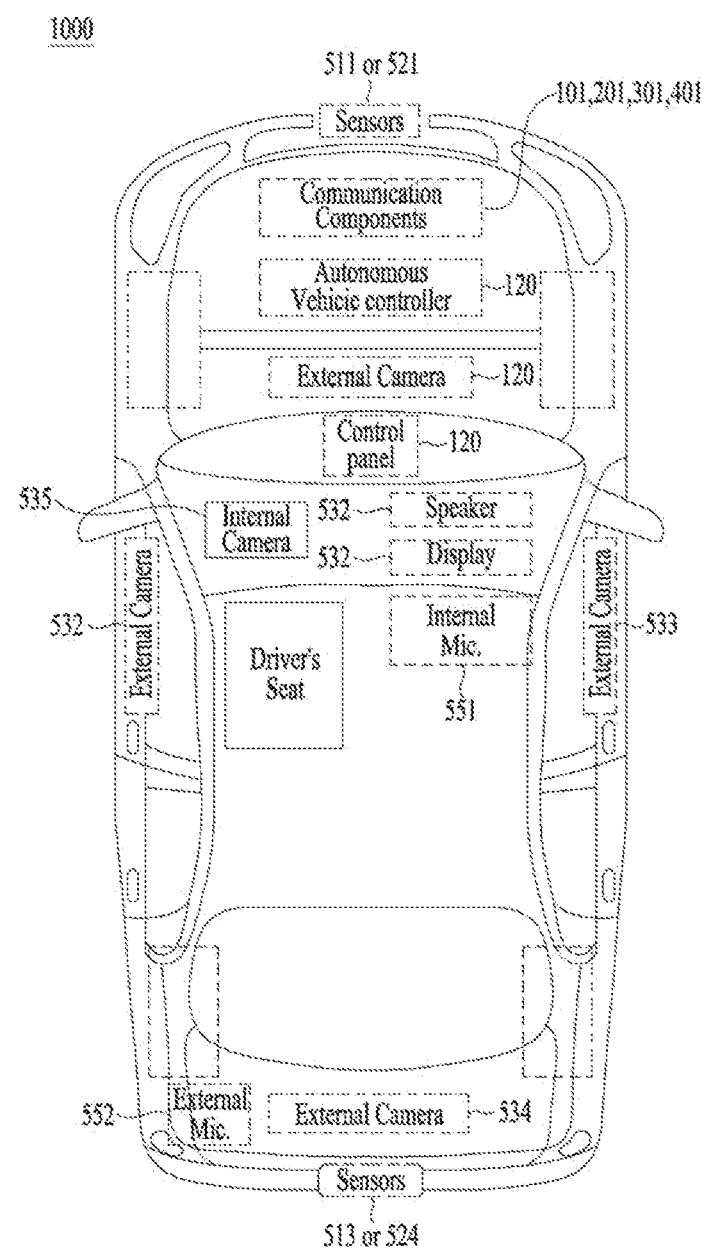
FIG. 2 is an exemplary diagram illustrating an example of application of an autonomous driving apparatus according to one of embodiments of the present disclosure to a vehicle.

FIG. 2 is an exemplary diagram illustrating an example of application of an autonomous driving apparatus according to one of embodiments of the present disclosure to a vehicle.

Hereinafter, a structure and function of an autonomous driving control system (e.g., an autonomous driving vehicle) to which the autonomous driving apparatus according to the embodiments is applicable will be described with reference to FIGS. 1 and 2.

As shown in FIG. 1, the autonomous driving vehicle 1000 may be implemented around an integrated autonomous driving controller 600 configured to transmit and receive data for control of autonomous driving of the vehicle through an operation information input interface 101, a driving information input interface 201, an occupant output interface 301, and a vehicle control output interface 401. In the present disclosure, the integrated autonomous driving controller 600 may be referred to as a controller, a processor, or a control unit.

The integrated autonomous driving controller 600 may acquire, through the operation information input interface 101, operation information according to the operation of the occupant on the user input unit 100 in an autonomous driving mode or a manual driving mode of the vehicle. As shown in FIG. 1, the user input unit 100 may include a driving mode switch 110 and a control panel 120 (e.g., a navigation terminal mounted on the vehicle, a smartphone or tablet carried by the occupant, etc.). Accordingly, the driving information may include driving mode information and navigation information about the vehicle.

For example, the driving mode (i.e., the autonomous driving mode/manual driving mode or sports mode/eco mode/safe mode/normal mode) of the vehicle, which is determined according to the operation of the driving mode switch 110 by the occupant, may be transmitted to the integrated autonomous driving controller 600 via the operation information input interface 101 as the above-described operation information.

Also, navigation information such as the occupant's destination and the route to the destination (the shortest route or preferred route selected by the occupant among candidate routes to the destination) input by the occupant through the control panel 120 may be transmitted as the operation information to the integrated autonomous driving controller 600 via the input interface 101.

The control panel 120 may be implemented as a touch screen panel that provides a user interface (UI) allowing the driver to input or modify information for autonomous driving control of the vehicle. In this case, the driving mode switch 110 described above may be implemented as a touch button on the control panel 120.

Also, the integrated autonomous driving controller 600 may acquire driving information indicating the driving state of the vehicle via the driving information input interface 201. The driving information may include a steering angle formed when the occupant manipulates a steering wheel, an accelerator pedal stroke or brake pedal stroke formed when the accelerator pedal or the brake pedal is depressed, and a variety of information indicating the driving state and behavior of the vehicle, such as vehicle speed, acceleration, yaw, pitch and roll behaviors formed in the vehicle. Each piece of the driving information may be detected by a driving information detector 200, which may include a steering angle sensor 210, an accelerator position sensor (APS)/pedal travel sensor (PTS) 220, a vehicle speed sensor 230, an acceleration sensor 240, and a yaw/pitch/roll sensor 250 as shown in FIG. 1.

Furthermore, the driving information about the vehicle may include location information about the vehicle. The location information about the vehicle may be acquired through a global positioning system (GPS) receiver 260 applied to the vehicle. The driving information may be transmitted to the integrated autonomous driving controller 600 via the driving information input interface 201 and utilized to control the driving of the vehicle in the autonomous driving mode or the manual driving mode of the vehicle.

Also, the integrated autonomous driving controller 600 may transmit driving state information, which is provided to the occupant in the autonomous driving mode or the manual driving mode of the vehicle, to an output unit 300 via the occupant output interface 301. That is, the integrated autonomous driving controller 600 may transmit the driving state information about the vehicle to the output unit 300, such that the occupant may check whether the vehicle is in the autonomous driving state or the manual driving state based on the driving state information output through the output unit 300. The driving state information may include various kinds of information indicating the driving state of the vehicle, such as, for example, a current driving mode, a shift range, and a vehicle speed.

In addition, upon determining that a warning needs to be issued to the driver in the autonomous driving mode or manual driving mode of the vehicle along with the driving state information, the integrated autonomous driving controller 600 may transmit warning information to the output unit 300 via the occupant output interface 301 such that the output unit 300 outputs a warning to the driver. In order to audibly and visually output the driving state information and the warning information, the output unit 300 may include a speaker 310 and a display 320 as shown in FIG. 1. In this case, the display 320 may be implemented as the same device as the aforementioned control panel 120 or as a separate and independent device.

Also, the integrated autonomous driving controller 600 may transmit, via the vehicle control output interface 401, control information for control of driving of the vehicle in the autonomous driving mode or manual driving mode of the vehicle to a sub-control system 400 applied to the vehicle. As shown in FIG. 1, the sub-control system 400 for control of driving of the vehicle may include an engine control system 410, a braking control system 420, and a steering control system 430. The integrated autonomous driving controller 600 may transmit engine control information, braking control information, and steering control information as the control information to each of the sub-control systems 410, 420, and 430 via the vehicle control output interface 401. Accordingly, the engine control system 410 may control the speed and acceleration of the vehicle by increasing or decreasing the fuel supplied to the engine, and the braking control system 420 may control braking of the vehicle by adjusting the vehicle braking force. Also, the steering control system 430 may control the steering of the vehicle through a steering system (e.g., a motor driven power steering (MDPS) system) applied to the vehicle.

As described above, the integrated autonomous driving controller 600 of this embodiment may acquire operation information according to the driver's manipulation and driving information indicating the driving state of the vehicle via the operation information input interface 101 and the driving information input interface 201, respectively, and may transmit driving state information and warning information generated according to the autonomous driving algorithm to the output unit 300 via the occupant output interface 301. It may also transmit control information generated according to the autonomous driving algorithm to the sub-control system 400 via the vehicle control output interface 401 such that driving control of the vehicle is performed.

In order to ensure stable autonomous driving of the vehicle, it is necessary to continuously monitor the driving state by accurately measuring the driving environment of the vehicle and to control driving according to the measured driving environment. To this end, the autonomous driving apparatus of this embodiment may include a sensor unit 500 configured to detect objects around the vehicle, such as nearby vehicles, pedestrians, roads, or fixed facilities (e.g., traffic lights, mileposts, traffic signs, construction fences, etc.), as shown in FIG. 1.

As shown in FIG. 1, the sensor unit 500 may include at least one of a light detection and ranging (LiDAR) sensor 510, a radar sensor 520, and a camera sensor 530 to detect a nearby object outside the vehicle.

The LiDAR sensor 510 detect a nearby object outside the vehicle by transmitting a laser signal to the vicinity of the vehicle and receiving a returning signal that is reflected on the object. The LiDAR sensor 510 may detect a nearby object located within a set distance, a set vertical field of view, and a set horizontal field of view, which are predefined according to the specification of the sensor. The LiDAR sensor 510 may include a front LiDAR sensor 511, a top LiDAR sensor 512, and a rear LiDAR sensor 513 installed at the front, top, and rear of the vehicle, respectively. However, the installation locations and the number of installations are not limited to a specific embodiment. A threshold for determining the validity of a returning laser signal reflected on the object may be pre-stored in a memory (not shown) of the integrated autonomous driving controller 600. The integrated autonomous driving controller 600 may determine the location of an object (including the distance to the object) and the speed and movement direction of the object by measuring the time taken for the laser signal transmitted through the LiDAR sensor 510 to be reflected on the object and return.

The radar sensor 520 may detect a nearby object outside the vehicle by emitting electromagnetic waves to the vicinity of the vehicle and receiving a returning signal that is reflected on the object. The radar sensor 520 may detect a nearby object located within a set distance, a set vertical field of view, and a set horizontal field of view, which are predefined according to the specification of the sensor. The radar sensor 520 may include a front radar sensor 521, a left radar sensor 522, a right radar sensor 523, and a rear radar sensor 524 installed on the front, left, right and rear surfaces of the vehicle, respectively. However, the installation locations and the number of installations are not limited to a specific embodiment. The integrated autonomous driving controller 600 may determine the location of an object (including the distance to the object) and the speed and movement direction of the object by analyzing the power of electromagnetic waves transmitted and received through the radar sensor 520.

The camera sensor 530 may detect nearby objects outside the vehicle by capturing an image of the surroundings of the vehicle, and may detect nearby objects located within a set distance, set vertical angle of view, and set horizontal angle of view, which are predefined according to the specification of the sensor.

The camera sensor 530 may include a front camera sensor 531, a left camera sensor 532, a right camera sensor 533, and a rear camera sensor 534 installed on the front, left, right and rear surfaces of the vehicle, respectively. However, the installation locations and the number of installations are not limited to a specific embodiment. The autonomous driving integrated controller 600 may determine may determine the location of an object (including the distance to the object) and the speed and movement direction of the object by applying predefined image processing to the image captured by the camera sensor 530.

In addition, an internal camera sensor 535 configured to capture an image of the inside of the vehicle may be mounted at a predetermined position (e.g., the rear view mirror) inside the vehicle, and the integrated autonomous driving controller 600 may monitor the behavior and state of the occupant based on the image acquired through the internal camera sensor 535 and output a guide or warning to the occupant through the above-described output unit 300.

In addition to the LiDAR sensor 510, the radar sensor 520, and the camera sensor 530, the sensor unit 500 may further include an ultrasonic sensor 540 as shown in FIG. 1. Also, various types of sensors for detecting objects around the vehicle may be further employed for the sensor unit 500.

FIG. 2 provided for understanding of this embodiment illustrates that the front LiDAR sensor 511 or the front radar sensor 521 is installed on the front side of the vehicle, the rear LiDAR sensor 513 or the rear radar sensor 524 is installed on the rear side of the vehicle, and the front camera sensor 531, the left camera sensor 532, the right camera sensor 533 and the rear camera sensor 534 are installed on the front side, left side, right side and rear side of the vehicle, respectively. However, as described above, the installation locations and number of installations of the sensors are not limited to a specific embodiment.

Furthermore, in order to determine the condition of the occupant in the vehicle, the sensor unit 500 may further include a biometric sensor configured to detect the occupant's bio-signals (e.g., heart rate, electrocardiogram, respiration, blood pressure, body temperature, brain waves, blood flow (pulse wave), blood sugar, etc.). The biometric sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 may additionally include a microphone 550. The microphone 550 may include an internal microphone 551 and an external microphone 552, which are used for different purposes, respectively.

The internal microphone 551 may be used, for example, to analyze the voice of an occupant in the autonomous driving vehicle 1000 based on AI or to immediately respond to a direct voice command.

On the other hand, the external microphone 552 may be used, for example, to appropriately operate for safe driving by analyzing various sounds generated from the outside of the autonomous driving vehicle 1000 using various analysis tools such as deep learning.

For reference, the components of the reference numerals shown in FIG. 2 may perform the same or similar functions as those shown in FIG. 1. Compared to FIG. 1, FIG. 2 illustrates the positional relationship between components (with respect to the inside of the autonomous driving vehicle 1000) in detail.

The LiDAR sensor may be used together with cameras and radars in environment recognition required for advanced driver assistance systems (ADAS) and autonomous driving (AD) automotive applications.

LiDAR may provide accurate range measurements of the environment. Thereby, the exact distances to moving objects and stationary objects in the environment may be estimated, and obstacles on a driving path may be sensed.

To use an environment recognition sensor for ADAS/AD applications, it is necessary to identify the sensor's pose, i.e., the sensor's position and orientation, with respect to a vehicle reference frame (VRF) such that the sensor's readings may be displayed in the VRF. The VRF for ADAS/AD may generally be defined as the center of the rear axle above the rear axle or just below the ground.

The process of determining the pose may be a kind of external calibration. The calibration performed while the vehicle is running on the road may be referred to as auto-calibration (AC).

Embodiments may improve offline LiDAR calibration. This operation may be performed as an end-of-line (EOL) calibration at the factory or a service calibration at a repair shop. However, it may be performed when the sensor is misaligned due to a shock casued by an accident or after the sensor removed for repair is reassembled.

Resources available for online external calibration may only relate to calibration between two (or more) sensors, not to the VRF.

The offline calibration procedure is problematic in that they require large and expensive calibration setups or equipment and the time for a skilled technician. Further, this one-time calibration procedure may hardly correct long-term sensor drift or detect erroneous calibration between drives, and thus may make the sensor information displayed in the VRF unreliable. Therefore, there is a need for a calibration procedure operated online while the vehicle is operated for its service life. Embodiments may provide such a process for the LiDAR sensor.

As long as AC is performed for at least one of the environment sensors, the other sensors may be calibrated indirectly with respect to the VRF through the existing online sensor-to-sensor calibration procedure. However, this violates the safety regulation of dualization and may expose potential calibration issues of the master sensor to all other sensors. Accordingly, embodiments may not rely on other ADAS sensors such as cameras, ultrasonic sensors, and radar.

Embodiments include a method for estimating the overall 6-DoF poses of an automotive LiDAR sensor with respect to the VRF with respective uncertainties without initial offline calibration when the vehicle is driven. This method may require the following information: the speed from an standard vehicle odometer sensor, i.e., a wheel encoder, and the yaw rate from an inertial measurement unit (IMU). Common LiDAR recognition software module, i.e., ground plane and ego motion estimation.

The AC algorithm may be ultra-lightweight, as it offloads all the heavy point cloud processing for other (upstream) modules used in ADAS/AD recognition architecture, which is for ground plane and ego motion estimation. In the case of the upstream recognition module, it has been demonstrated that the module can be run in real time on an automotive grade embedded board, at frequencies ≥20 Hz.

Embodiments may provide the following effects. The ADAS/AD system according to the embodiments may compensate for a long-term sensor pose drift and sense a change in sensor pose between drives. Since the embodiments do not rely on the calibration of other environment sensors, sensor redundancy may be maintained even when other sensors are incorrectly calibrated. Together with the 6-DoF pose, each uncertainty may be estimated, such that each consumer of the output (e.g., sensor fusion) may set an operational certainty threshold. The threshold may be used to store the converged AC results in a non-volatile memory (NVM). Accordingly, the latest AC may be provided at the start of each work cycle. As it does not rely on previous offline calibration procedures, it may be potentially obsolete, which may significantly save time and equipment for both the OEM assembly line and auto repair shop services.

Output definition according to embodiments:

A method according to embodiments may calculate an estimate with regard to the LiDAR pose. The VRF consisting of 6 parameters is configured as follows:

$$\{x,y,z, \text{Roll}(\varphi), \text{Pitch}(\theta), \text{Yaw}(\psi)\},$$

where the first three elements may encode positions in Cartesian coordinates and the last three elements may encode directions at Tait-Bryan angles around the x, y and z axes, respectively. Also, the uncertainty of the estimate of each parameter may be calculated in the form of variance as follows:

$$\{\sigma_x^2, \sigma_y^2, \sigma_z^2, \sigma_{100}^2, \sigma_\theta^2, \sigma_{104}^2\}.$$

The VRF basically has its origin below the center of the rear axle at ground level. Instead, when a calibration is necessary for the center of the rear axle, the axle height should be measured and provided manually as it cannot be observed by the LiDAR and is simply subtracted from the estimated parameter z.

Figure 3:
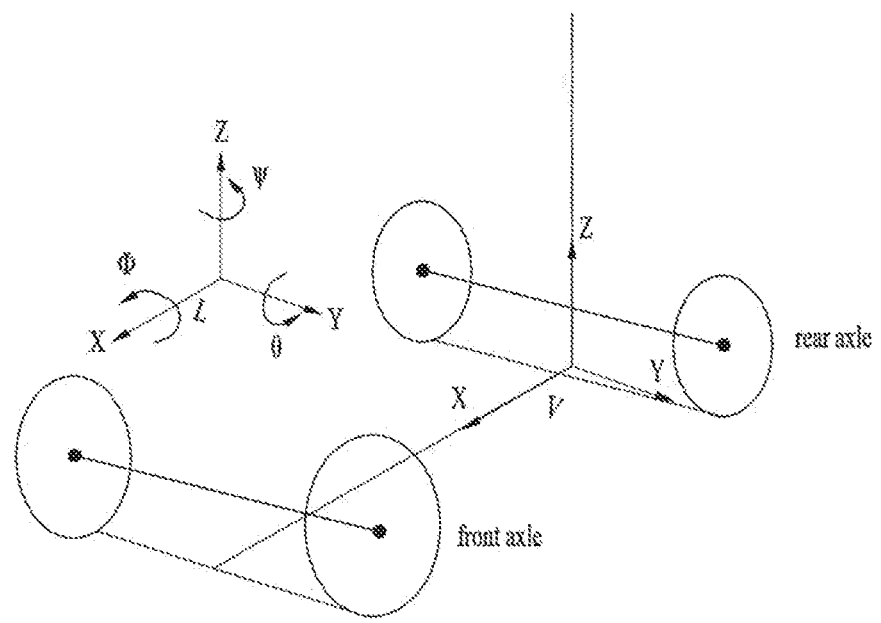
FIG. 3 illustrates coordinate systems of a vehicle (V) and a LiDAR (L) according to embodiments.

FIG. 3 illustrates coordinate systems of a vehicle (V) and a LiDAR (L) according to embodiments.

FIG. 3 shows coordinate information related to a vehicle 300 and the LiDAR of the vehicle according to the embodiments of FIGS. 1 and 2. The vehicle 300 may correspond to the vehicle of FIGS. 1 and 2.

FIG. 3 shows a vehicle reference coordinate system (V) and a reference coordinate system 301 of the virtual front LiDAR (L) mounted on the front of the vehicle according to embodiments. Also, the figure shows the axes of the Roll, Pitch, and Yaw direction angles and the positive direction to the right.

The AC method/apparatus according to the embodiments requires the following basic inputs:
1. Vehicle speed from the wheel encoder and yaw rate from the IMU via a controller area network (CAN) bus of the vehicle;
2. LiDAR point cloud and timestamp:
An algorithm according to embodiments may not process the LiDAR point cloud. Instead, it may receive the result of the upstream recognition module;
3. LiDAR ego movement estimates and their respective uncertainties;
4. Ground plane estimates and their respective uncertainties.

Figure 4:
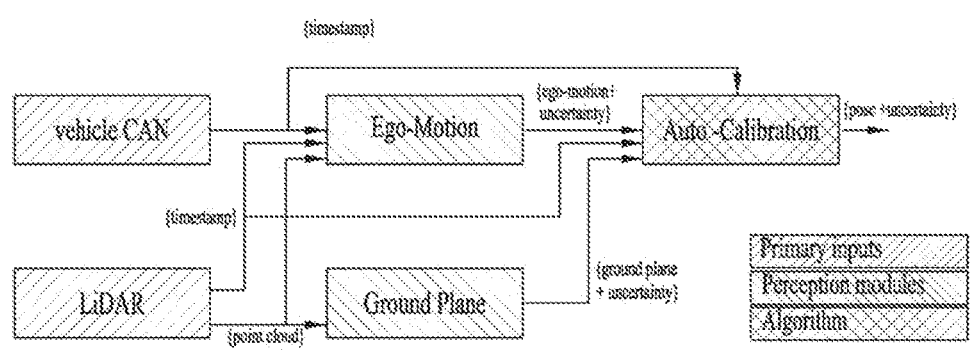
FIG. 4 shows an architecture for an AC algorithm according to embodiments.

FIG. 4 shows an architecture for an AC algorithm according to embodiments.

The vehicle, the vehicle control apparatus, and the vehicle control method according to the embodiments of FIGS. 1 to 3 may use auto-calibration based on the architecture shown in FIG. 4. In addition, the AC algorithm according to embodiments may rely on non-critical calculations of a software module not described herein.

Algorithm according to embodiments:

Full 6-DoF pose estimation may be performed by combining three different sub-methods. Each of the methods may require a specific precondition for vehicle operation that must be met in order for the result to be valid and numerically feasible. Vehicle motion preconditions for each sub-method for calibration may be identified using estimation of the vehicle CAN speed and yaw rate or LiDAR ego motion module.

For each sub-method for calibration, when the precondition is met and the step estimate is successfully computed, the corresponding filter may be updated with a new step estimate.

FIG. 5 shows an AC method according to embodiments.

The pose parameter according to the embodiments may be estimated as follows.

The vehicle, the vehicle control apparatus, and the vehicle control method according to the embodiments may calibrate the road and yaw information as follows.

Road calibration:

When the vehicle is driving and not set to "Too Fast," LiDAR coordinate information (LiDAR {z, Roll, Pitch}) may be extracted directly from an estimated ground plane (ground) given by the coefficients {a, b, c, d} of the plane equation ax+by+cz+d=0. The z, roll, and pitch coordinate information may be calculated as follows.

$$\hat{z} = |d|/\sqrt{a^2+b^2+c^2},$$

$$\hat{\varphi} = a\,\tan(b/c),$$

The ground plane normal for the roll may be compensated for, and then the pitch coordinate information may be calculated.

$$\hat{\theta}0\ a\,\tan(-a'/c').$$

Here, the road calibration may be performed at a standstill. However, when the vehicle should travel at a speed greater than or equal to a certain minimum speed, calibrations for offset ground planes, such as the beginning or end of a steep ramp may be avoided. Also, "too," "sufficient," "enough," and similar terms mean that there is a configurable threshold.

Yaw calibration:

When the vehicle moves rectilinearly, the LiDAR magnetic transformation for roll and pitch may be calibrated for calibration if calibration parameters {Roll, Pitch} are known with "sufficient certainty."

$$\hat{\psi} = a\,\tan(-t_y'/t_x').$$

Here, long-term very light turn theoretically biases the Yaw estimate, but its effect is negligible.

Horizontal position calibration:

When the vehicle turns "sufficiently fast" and the calibration parameters {Roll, Pitch, Yaw} are known with "sufficient certainty", then the LiDAR self-transformation for roll and pitch may be calibrated and the horizontal LiDAR position may be calculated. The horizontal LiDAR position {x, y} may be calculated.

Assuming that the velocity of the VRF is aligned with the vertical axis, the vehicle velocity and yaw rate may be related to the horizontal LiDAR magnetic transformation through the calibration parameters {x, y, Yaw} by $\vec{t_V} + (R_V \vec{p_L}) = \vec{p_L} + (R_{L \to V} \vec{t_L})$.

Re-arrangement may be performed as follows.

$$\begin{bmatrix} \hat{x} \\ \hat{y} \end{bmatrix} \stackrel{def}{=} \vec{p_L} = (R_V - I_2)^{-1}(R_{L \to V} \vec{t_L} - \vec{t_V}),\ \text{where:}$$

$\vec{t_V}$ and $R_V$ denote transformation and rotation of the VRF derived from the vehicle speed, the yaw rate and the LiDAR cycle time, respectively;

$\vec{t_L}$ denotes the 2D horizontal LiDAR self-transformation after roll and pitch calibrations;

$R_{L \to V}$ denotes yaw calibration rotation.

$I_2$ denotes a 2×2 identity matrix.

Here, it is assumed that there is no tire slip or steering on the rear axle. The effect of slipping of the rear tire in cornering is negligible. The rear axle steering may override this sub-method.

Uncertainty propagation and filtering

The method/apparatus according to the embodiments performs step estimation on a pose parameter. The estimates are combined via an online incremental weighted average filter, which is configured to set the weights using the variance of the step-by-step estimates. To this end, we propagate the variance of ego movement and ground plane inputs through the computation of step estimates.

To randomly map an input $\vec{x}$ to an output $\vec{y}$ of any dimension, the variance may be propagated by approximation by linearizing f through a first-order Taylor series expansion around a given input $\vec{x_0}$, i.e., $f(\vec{x}) \approx f(\vec{x_0}) + J \cdot (\vec{x} - \vec{x_0})$ (where J is the Jacobian matrix of f) An output covariance matrix result is output as $\Sigma_y = J \cdot \Sigma_x \cdot J^T$. When the covariance term is not available, the input covariance matrix may be approximated as $\Sigma_x \approx \text{diag}(\vec{\sigma_x^2})$.

A filter used to estimate a fixed calibration parameter may be a weighted average filter that has an inverse variance weight $w_t = 1/\sigma_{x_t}^2$ in the absence of body movement. This filter may be used to calculate the final estimate.

$$\hat{x} = \frac{\sum_i \hat{x}_i / \sigma_{\hat{x}_i}^2}{\sum_i 1/\sigma_{\hat{x}_i}^2}$$

Each variance is represented as:

$$\sigma_{\hat{x}}^2 = (\Sigma_i\ 1/\sigma_{\hat{x}_i}^2)^{-1}.$$

This filtering is applied to each individual pose parameter.

Here, on the assumption that the first-step estimates are independent and follow a normal distribution with the same average, the variance of the weighted average may be minimized, making the filter a maximum likelihood estimator (MLE) of the average.

Figure 6:
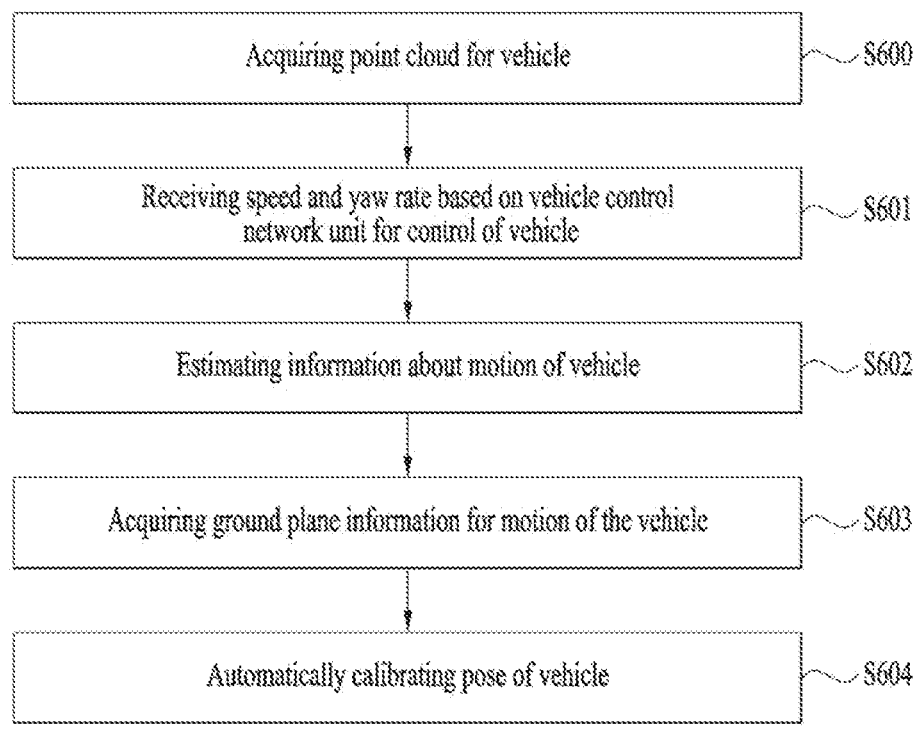
FIG. 6 illustrates a vehicle control method according to embodiments.

FIG. 6 illustrates a vehicle control method according to embodiments.

FIG. 6 is a flowchart of the vehicle control method of FIG. 5 by the vehicle of FIGS. 1, 2 and 4. Each component may be implemented by hardware, software, processor, and/or a combination thereof in FIGS. 1, 2 and 4.

S600: The vehicle control method according to the embodiments may include acquiring a point cloud for a vehicle.

S601: The vehicle control method may further include receiving a speed and a yaw rate based on a vehicle control network unit for control of the vehicle.

S602: The vehicle control method may further include estimating information about a motion of the vehicle.

S603: The vehicle control method may further include acquiring ground plane information for the motion of the vehicle.

S604: The vehicle control method may further include automatically calibrating a pose of the vehicle.

The automatic calibrating of the pose of the vehicle may include: based on the vehicle traveling at a specific speed (which is determined to be fast when it is greater than or equal to a threshold), updating coordinate information about the vehicle, the coordinate information including z-axis information, roll information, and pitch information about a Cartesian coordinate system; when the vehicle rectilinearly travels and the roll information and the pitch information are available, updating yaw information; when the vehicle turns at a speed greater than or equal to a specific speed and the roll information, the pitch information, and the yaw information are available, updating x-axis information and y-axis information about the Cartesian coordinate system.

The automatic calibrating of the pose of the vehicle may be performed based on the motion unit and the vehicle control network unit.

The updating of the z-axis information, the roll information, and the pitch information may include extracting the z-axis information, the roll information, and the pitch information based on the ground plane information calculated by the controller, and calculating the z-axis information, the roll information, and the pitch information based on coefficients of a plane equation.

The updating of the yaw information may include updating the yaw information from translation values of the roll information and the pitch information.

The updating of the x-axis information and the y-axis information may be performed based on a translation value and rotation value of a vehicle reference frame obtained from the speed and yaw rate of the vehicle, a LiDAR translation value, and a rotation value for yaw calibration.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

What is claimed is:

1. A vehicle comprising:
   a light detection and ranging (LiDAR) sensor configured to acquire a point cloud for the vehicle; and
   a processor configured to:
   control the vehicle;
   process a speed and a yaw rate of the vehicle received from an inertial measurement unit (IMU);
   estimate motion information of the vehicle;
   estimate ground plane information of the LiDAR sensor; and
   update pose parameters of the vehicle based on at least one of the estimated motion information, the estimated ground plane information, the processed speed and yaw rate of the vehicle by performing one or more selected from a group of calibration operations, the group of calibration operations including:
   in response to the speed of the vehicle being less than or equal to a first specific speed, updating z-axis information in a Cartesian coordinate system, roll information, and pitch information about the Cartesian coordinate system among the pose parameters of the vehicle,
   in response to the vehicle rectilinearly traveling, and the roll information and the pitch information being available, updating yaw information among the pose parameters of the vehicle;
   in response to the vehicle turning at a speed greater than or equal to a second specific speed and the roll information, the pitch information, and the yaw information being available, updating x-axis information and y-axis information in the Cartesian coordinate system among the pose parameters of the vehicle, wherein the first specific speed and the second specific speed are same or different; and
   automatically calibrate a pose of the vehicle based on the updated pose parameters.

2. The vehicle of claim 1,
   wherein the processor is configured to propagate variances of the estimated motion information and the estimated ground plane information using an online incremental weighted average filter.

3. The vehicle of claim 1, wherein the estimated motion information includes an estimated motion of the vehicle and first certainty information representing that a reliability of the estimated motion of the vehicle is greater than a first threshold, and the estimated motion information includes an estimated ground plane of the LiDAR sensor and second certainty information representing that a reliability of the estimated ground plane of the LiDAR sensor is greater than a second threshold.

4. The vehicle of claim 1, wherein the processor is further configured to:
   extract the z-axis information, the roll information, and the pitch information based on the estimated ground plane information; and
   calculate the z-axis information, the roll information, and the pitch information based on coefficients of a plane equation.

5. The vehicle of claim 1, wherein the processor is further configured to:
   update the yaw information from transformation values of the roll information and the pitch information.

6. The vehicle of claim 1, wherein
   wherein the processor is configured to:
   update the x-axis information and the y-axis information based on a transformation value and rotation value of a vehicle reference frame obtained from the processed speed and yaw rate of the vehicle, a LiDAR transformation value, and a rotation value for yaw calibration.

7. The vehicle of claim 1, wherein the LiDAR sensor is configured to acquire time information related to the point cloud.

8. A method for controlling a vehicle, the method comprising:
   acquiring a point cloud for the vehicle;
   processing a speed and a yaw rate of the vehicle received from an inertial measurement unit (IMU);
   estimate motion information of the vehicle;
   estimate ground plane information of a light detection and ranging (LiDAR) sensor configured to acquire a point cloud for the vehicle; and
   update pose parameters of the vehicle based on at least one of the estimated motion information, the estimated ground plane information, the processed speed and yaw rate of the vehicle by performing one or more selected from a group of calibration operations, the group of calibration operations including:
   in response to the speed of the vehicle being less than or equal to a first specific speed, information in a Cartesian coordinate system, roll information, and pitch information about the Cartesian coordinate system among the pose parameters of the vehicle,
   in response to the vehicle rectilinearly traveling, and the roll information and the pitch information being available, updating yaw information among the pose parameters of the vehicle;
   in response to the vehicle turning at a speed greater than or equal to a second specific speed and the roll information, the pitch information, and the yaw information being available updating x-axis information and y-axis information in the Cartesian coordinate system among the pose parameters of the vehicle, wherein the first specific speed and the second specific speed are same or different; and
   automatically calibrate a pose of the vehicle based on the updated pose parameters.

9. The method of claim 8,
   wherein the method comprises: propagating variances of the estimated motion information and the estimated ground plane information using an online incremental weighted average filter.

10. The method of claim 8,
    wherein the estimated motion information includes an estimated motion of the vehicle and first certainty information representing that a reliability of the estimated motion of the vehicle is greater than a first threshold, and the estimated motion information includes an estimated ground plane of the LiDAR sensor and second certainty information representing that a reliability of the estimated ground plane of the LiDAR sensor is greater than a second threshold.

11. The method of claim 8, wherein the updating of the z-axis information, the roll information, and the pitch information comprises:
  extracting the z-axis information, the roll information, and the pitch information based on the estimated ground plane information; and
  calculating the z-axis information, the roll information, and the pitch information based on coefficients of a plane equation.

12. The method of claim 8, wherein the updating of the yaw information comprises:
  updating the yaw information from transformation values of the roll information and the pitch information.

13. The method of claim 8, wherein the updating of the x-axis information and the y-axis information is performed based on a transformation value and rotation value of a vehicle reference frame obtained from the speed and yaw rate of the vehicle, a light detection and ranging (LiDAR) transformation value, and a rotation value for yaw calibration.

14. An apparatus for controlling a vehicle, comprising
  a light detection and ranging (LiDAR) sensor configured to acquire a point cloud for the vehicle;
  a processor configured to:
  control a vehicle;
  process a speed and a yaw rate of the vehicle received from an inertial measurement unit (IMU);
  estimate motion information of the vehicle, the estimated motion information including an estimated motion of the vehicle and first certainty information representing that reliability of the estimated motion of the vehicle is greater than a first threshold;
  estimate ground plane information of a light detection and ranging (LiDAR) sensor configured to acquire a point cloud for the vehicle, the estimated motion information including an estimated ground plane of the LiDAR sensor and second certainty information representing that reliability of the estimated ground plane of the LiDAR sensor is greater than a second threshold; and
  update pose parameters of the vehicle based on at least one of the estimated motion information, the estimated ground plane information, the processed speed and yaw rate of the vehicle by performing one or more selected from a group of calibration operations, the group of calibration operations including:
  in response to the speed of the vehicle being less than or equal to a first specific speed, information in a Cartesian coordinate system, roll information, and pitch information about the Cartesian coordinate system among the pose parameters of the vehicle,
  in response to the vehicle rectilinearly traveling, and the roll information and the pitch information being available, updating yaw information among the pose parameters of the vehicle;
  in response to the vehicle turning at a speed greater than or equal to a second specific speed and the roll information, the pitch information, and the yaw information being available, updating x-axis information and y-axis information in the Cartesian coordinate system among the pose parameters of the vehicle, wherein the first specific speed and the second specific speed are same or different; and
  automatically calibrate a pose of the vehicle based on the updated pose parameters.

15. The apparatus of claim 14,
  wherein the processor is configured to propagate variances of the estimated motion information and the estimated ground plane information using an online incremental weighted average filter.

16. The apparatus of claim 14, wherein the estimated motion information includes an estimated motion of the vehicle and first certainty information representing that a reliability of the estimated motion of the vehicle is greater than a first threshold, and the estimated motion information includes an estimated ground plane of the LiDAR sensor and second certainty information representing that a reliability of the estimated ground plane of the LiDAR sensor is greater than a second threshold.

17. The apparatus of claim 14,
  wherein the processor is configured to:
  extract the z-axis information, the roll information, and the pitch information based on the estimated ground plane information; and
  calculate the z-axis information, the roll information, and the pitch information based on coefficients of a plane equation.

18. The apparatus of claim 14,
  wherein the processor is configured to:
  update the yaw information from transformation values of the roll information and the pitch information.

19. The apparatus of claim 14,
  wherein the processor is configured to:
  update the x-axis information and the y-axis information based on a transformation value and rotation value of a vehicle reference frame obtained from the processed speed and yaw rate of the vehicle, a LiDAR transformation value, and a rotation value for yaw calibration.

20. The apparatus of claim 14, wherein the LiDAR sensor is configured to acquire time information related to the point cloud.

* * * * *